(12) United States Patent
Springer et al.

(10) Patent No.: US 9,774,576 B2
(45) Date of Patent: Sep. 26, 2017

(54) AUTHENTICATION BY USE OF SYMMETRIC AND ASYMMETRIC CRYPTOGRAPHY

(71) Applicant: EM Microelectronic-Marin S.A., Marin (CH)

(72) Inventors: James J. Springer, Colorado Springs, CO (US); Stephanie Salgado, La Neuveville (CH)

(73) Assignee: EM Microelectronic-Marin S.A., Marin (CH)

( * ) Notice: Subject to any disclaimer, the term of this patent is extended or adjusted under 35 U.S.C. 154(b) by 38 days.

(21) Appl. No.: 14/217,807

(22) Filed: Mar. 18, 2014

(65) Prior Publication Data

US 2015/0271159 A1 Sep. 24, 2015

(51) Int. Cl.
| H04L 29/06 | (2006.01) |
| H04L 9/08  | (2006.01) |
| H04L 9/32  | (2006.01) |
| G06F 7/58  | (2006.01) |

(52) U.S. Cl.
CPC ............ *H04L 63/061* (2013.01); *G06F 7/588* (2013.01); *H04L 9/0844* (2013.01); *H04L 9/3273* (2013.01); *H04L 63/0435* (2013.01); *H04L 63/0442* (2013.01); *H04L 2209/805* (2013.01); *H04L 2209/84* (2013.01)

(58) Field of Classification Search
USPC ........................................................ 713/171
See application file for complete search history.

(56) References Cited

U.S. PATENT DOCUMENTS

| 5,841,864 | A   |    | 11/1998 | Klayman et al. |           |
|-----------|-----|----|---------|----------------|-----------|
| 6,785,813 | B1  | *  | 8/2004  | Vanstone       | H04L 9/0841 |
|           |     |    |         |                | 380/30    |
| 7,123,721 | B2  | *  | 10/2006 | Panjwani       | H04L 63/061 |
|           |     |    |         |                | 380/270   |
| 7,450,010 | B1  | *  | 11/2008 | Gravelle       | G06F 21/606 |
|           |     |    |         |                | 340/10.1  |
| 7,602,920 | B2  |    | 10/2009 | Hameau et al.  |           |
| 8,156,334 | B2  | *  | 4/2012  | Ho             | H04L 9/0844 |
|           |     |    |         |                | 713/168   |
| 8,209,533 | B2  | *  | 6/2012  | Struik         | H04L 9/0844 |
|           |     |    |         |                | 713/168   |
| 2002/0034301 | A1 | * | 3/2002 | Andersson      | G06F 21/31 |
|           |     |    |         |                | 380/270   |
| 2002/0056044 | A1 | * | 5/2002 | Andersson      | H04L 63/0428 |
|           |     |    |         |                | 713/189   |
| 2002/0107798 | A1 |    | 8/2002  | Hameau et al.  |           |
| 2004/0066278 | A1 | * | 4/2004 | Hughes         | G06F 21/31 |
|           |     |    |         |                | 340/10.1  |

(Continued)

*Primary Examiner* — Farid Homayounmehr
*Assistant Examiner* — Thanh T Le
(74) *Attorney, Agent, or Firm* — Oblon, McClelland, Maier & Neustadt, L.L.P.

(57) ABSTRACT

The present invention concerns a mutual authentication method in a communication system. According to the method, a first communication device (1), such as an RFID reader, authenticates a second communication device (3), such as an RFID tag, by using an asymmetric authentication protocol based on a generated a session key. The tag authenticates the reader by using a symmetric communication protocol based on a generated other session key. At least a portion of the session key is used to generate the other session key.

14 Claims, 2 Drawing Sheets

(56) References Cited

U.S. PATENT DOCUMENTS

| | | | |
|---|---|---|---|
| 2005/0232426 A1* | 10/2005 | Konersmann | H04L 63/0428 380/277 |
| 2006/0053289 A1* | 3/2006 | Singh | H04L 9/3273 713/169 |
| 2007/0258594 A1 | 11/2007 | Sandhu et al. | |
| 2008/0292105 A1* | 11/2008 | Wan | H04L 9/0825 380/282 |
| 2009/0288143 A1* | 11/2009 | Stebila | G06F 21/445 726/3 |
| 2010/0153731 A1* | 6/2010 | Duc | H04L 9/3271 713/175 |
| 2011/0283107 A1 | 11/2011 | Villegas et al. | |
| 2012/0039474 A1* | 2/2012 | Ho | H04L 9/0844 380/278 |
| 2013/0202108 A1* | 8/2013 | Kao et al. | 380/44 |
| 2013/0212380 A1* | 8/2013 | Brutch | H04L 29/06816 713/156 |
| 2013/0335198 A1* | 12/2013 | Xue | G06F 21/31 340/10.1 |
| 2014/0047513 A1* | 2/2014 | van 't Noordende | G06F 21/44 726/4 |

\* cited by examiner

AUTHENTICATION BY USE OF SYMMETRIC AND ASYMMETRIC CRYPTOGRAPHY

TECHNICAL FIELD

The invention relates to the field of authentication methods. For instance, the teachings of the present invention can be applied in radio frequency identification (RFID) systems. The invention also relates to communication devices involved in the authentication method and to a communication system where the teachings of the present invention can be applied.

BACKGROUND OF THE INVENTION

In many communication systems, such as RFID systems, it is important to be able to authenticate different parties of the communication system. For instance, RFID systems that are used for many applications consist of one or more RFID readers, also known as interrogators or base stations, and one or more RFID tags, also known as labels or transponders. Some applications (e.g. tolling) benefit from having functionality to determine if tags and their data content are genuine or counterfeit. A common approach for this functionality is to utilize cryptographic methods to perform tag authentication (TA) and/or mutual authentication (MA). TA ensures that the tag is genuine while MA ensures the reader is genuine and authorized to alter the data content of a tag.

Cryptographic methods rely upon the communicating parties to have common knowledge of a shared secret or the ability to compute a shared secret. There are two primary schemes used. One is based on symmetric cryptography while the other is based on asymmetric cryptography, often referred to as public key cryptography (PKC).

Typical symmetric cryptography includes block ciphers, such as data encryption standard (DES) and advanced encryption standard (AES), and stream ciphers, such as Grain. Symmetric cryptography requires both the communicating parties to share the same secret key. It means that the secret must be previously shared or agreed between the communicating parties. This is usually not a strong constraint in closed systems where both communicating parties are managed by the same system operator. In open systems, key management is more critical and may indeed represent a prohibitive constraint. Symmetric algorithms are extremely fast compared with asymmetric algorithms, and the hardware implementation may be efficient and economical in resource usage.

Typical asymmetric cryptography includes RSA, Diffie-Hellman (DH), or elliptic curve cryptosystems (ECC), and Algebraic Eraser™. Asymmetric algorithms use pairs of keys. Each communicating entity, e.g. a reader and a tag, has its own key pair comprising a public key and a private key. The private keys are not shared. Asymmetric algorithms are usually slow compared with symmetric algorithms, and the hardware implementations are significantly more resource-intensive.

Some applications are a combination of an open system for interoperability and a closed system to ensure integrity of the communicating party data content. For example, toll applications often use RFID and benefit from a tag originating from one agency or region (Agency A) to be used in a different agency or region (Agency B). However, the originating agency may want the exclusive ability to alter the tag's data content. Additionally, the application may have requirements for very fast transaction times (e.g. <20 ms) which further restrict possible solutions.

Assume a tag from Agency A is read by a reader from A. This is a closed system and symmetric cryptography is a natural choice for performing TA and practically the only choice for MA.

Assume a tag from Agency A is read by a reader from Agency B. TA is only possible if Agency A is willing to share the tag's key with Agency B. For symmetric cryptography, Agency A must provide the tag's secret key to Agency B. Key exchange between agencies can be difficult and represents a finite risk of compromising all the tag secret keys. This risk is often great enough to affect communication adversely between the parties. For asymmetric cryptography, Agency A must provide the tag's public key to Agency B. Key exchange between agencies is simple and represents no risk of compromising tag private keys. This helps promote communication, so asymmetric cryptography is a good choice for TA.

Often a first communication device must be able to authenticate a second communication device of unknown origin and thus to read data from that device. For instance, consider a situation in which a reader from Agency A must read a tag of unknown origin, possibly from Agency A or possibly from Agency B. The reader must perform very fast transaction times, so there is no additional time permitted to determine the origin of the tag to know if TA should be done using symmetric or asymmetric cryptography. The problem is thus related to the speed of the transaction. One of the bottlenecks is the time taken to select the appropriate authentication protocol. Additionally, if the tag is from Agency A, the reader from agency A may want to update the data content of the tag using MA. Here again, this transaction should be done as quickly as possible.

SUMMARY OF THE INVENTION

It is an object of the present invention to overcome the problem identified above related to the fast and reliable authentication of communication devices.

According to a first aspect of the invention, there is provided an authentication method for a first communication device to authenticate a second communication device, the method comprising:
  the first communication device receiving at least a portion of a first session key of the second communication device;
  the first communication device generating a first session key of the first communication device using an asymmetric key generation algorithm;
  the first communication device comparing at least the portion of the first session key of the second communication device and at least a first portion of the first session key of the first communication device, to thereby authenticate the second communication device;
  the first communication device generating a second session key of the first communication device using a symmetric key generation algorithm, if at least the portion of the first session key of the second communication device and at least the first portion of the first session key of the first communication device are the same, such that the second communication device can authenticate the first communication device,
  wherein at least a second portion of the first session key of the first communication device is used to generate the second session key of the first communication device.

The proposed new solution has the advantage that the second communication device can be authenticated quickly and reliably and that the second session key of the first communication device for the mutual authentication is obtained with minimal processing power. This means for instance that the first communication device does not need to generate a random number, unlike standard symmetric algorithms, because the first session key of the first communication device is used to generate the second session key of the first communication device. Thus, when the symmetric algorithm of the invention is used, only the steps necessary to authenticate the first communication device are needed. Accordingly, the present invention provides a smart combination of asymmetric and symmetric authentication protocols.

According to a second aspect of the invention, there is provided a computer program product comprising instructions for implementing the steps of a method, when loaded and run on computer means of the first communication device.

According to a third aspect of the invention, there is provided a first communication device for authenticating a second communication device, the first communication device comprising means for:
receiving at least a portion of a first session key of the second communication device;
generating a first session key of the first communication device by using an asymmetric key generation algorithm;
comparing at least the portion of the first session key of the second communication device and at least a first portion of the first session key of the first communication device; and
generating a second session key of the first communication device by using a symmetric key generation algorithm, if at least the portion of the first session key of the second communication device and the first portion of the first session key of the first communication device are the same,
wherein the means for generating the second session key of the first communication device is arranged such that the second session key of the first communication device is to be generated using at least a second portion of the first session key of the first communication device.

According to a fourth aspect of the invention, there is provided a second communication device for authenticating a first communication device, the second communication device comprising means for:
receiving a public key of the first communication device;
generating a first session key of the second communication device by use of the public key of the first communication device by using an asymmetric key generation algorithm;
generating a second session key of the second communication device by using a symmetric key generation algorithm;
receiving at least a portion of a session key of the first communication device; and
comparing at least a portion of the second session key of the second communication device and at least the portion of the session key of the first communication device to authenticate the first communication device,
wherein the means for generating the second session key of the second communication device is arranged to use at least a portion of the first session key of the second communication device to generate the second session key of the second communication device.

According to a fifth aspect of the invention, there is provided a communication system comprising the first communication device and the second communication device.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF EMBODIMENTS OF THE INVENTION

Figure 1:
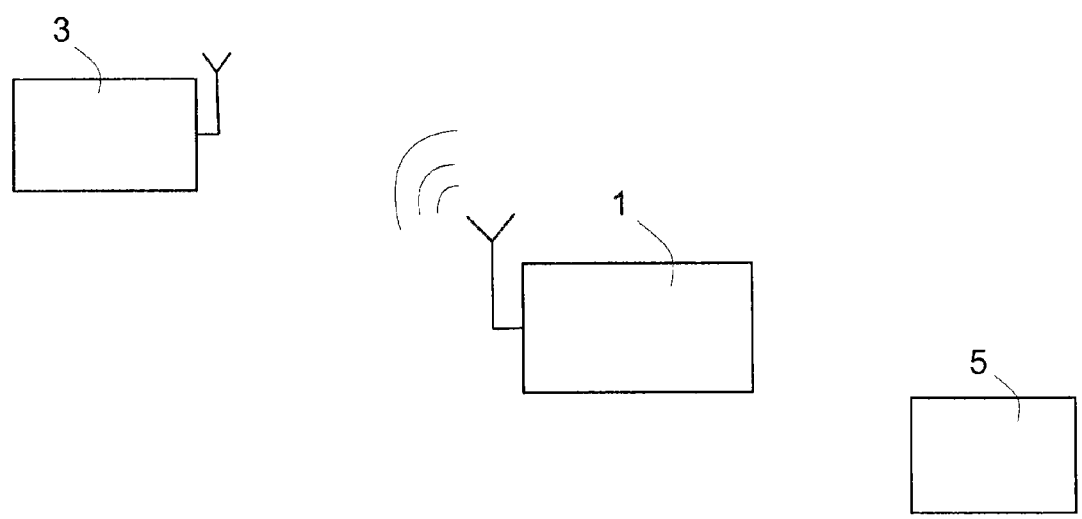
FIG. 1 is a block diagram showing network elements involved in the authentication process according to an embodiment of the present invention.

An embodiment of the present invention will now be described in detail with reference to the attached figures. This embodiment will be described in the context of an RFID system used for road toll collection. However, the teachings of the present invention are not limited to the field of RFID or to toll collection applications. Identical functional and structural elements which appear in the different drawings are assigned the same reference numerals.

FIG. 1 shows an RFID system to which the teachings of the present invention can be applied. A first communication device 1, which may be an RFID reader or interrogator, is arranged to communicate with a second communication device 3, which may be an RFID tag, by means of radio frequency electromagnetic fields. The tag 3 contains electronically stored information. The tag 3 may be powered and read by the reader 1 at short ranges (for example a few meters) via magnetic fields (electromagnetic induction), and then act as a passive transponder to emit microwaves or ultra-high frequency (UHF) radio waves. The tag 3 may alternatively use a local power source, such as a battery, and may be read over a greater distance, for example of hundreds of meters. The tag does not need to be within line of sight of the reader 1. The reader 1 is also able to communicate wirelessly or via a wired connection with a database 5. The database 5 may contain for instance a list of tag identifiers managed by the reader 1 and shared secret keys for different tags.

In this example, the tag 3 may be affixed to a vehicle, and is required to communicate the vehicle's identity to the reader 1 installed in a gantry at a road toll collection area. This example application may have the following requirements:
The authentication transaction time is especially critical as the vehicle must pass the toll gantry quickly. This means that there are strong timing constraints on both tags and readers.
The system is open. This means that there are several operators. Each operator produces and/or manages its own tags and readers. However, the tags should be able to authenticate to any reader, whatever its origin. Accordingly, a tag of operator A for example, should be able to authenticate itself not only to readers of operator A, but also to readers of operator B.
Specific operators may want to update their own tags. This may mean for instance that readers A need to authenticate themselves to the tags A (with mutual authentication). However, it is not desirable that readers of operator B should be able to modify the content of tags A, since they do not belong to the same operator.

If a reader 1 of operator A singulates a tag 3 of operator A, it is natural to perform a mutual authentication using symmetric cryptography because both the reader and the tag share the same secret key and this type of authentication method is quick. The term singulation refers to a method by which an RFID reader identifies a specific tag from a number of tags within in its reading field. On the other hand, if the tag 3 is of operator B, tag authentication would be performed only with an asymmetric algorithm. The problem is the decision time required to select the protocol to launch the authentication. The reader 1 receives the identification number (ID) of the tag 3. Based on this ID, it can decide whether to launch a tag authentication based on a symmetric or an asymmetric algorithm. To make this choice, the reader searches in a look-up table in the database 5 relating to the operator to which the tag belongs. As the number of the tags can be very high, this search operation may take too much time. Another option is to use a key derivation algorithm based on the ID which might take less time than searching a look-up table but also represents a large security risk if the algorithm is discovered.

According to the present invention, the initial decision time of the reader is eliminated. This is achieved by systematically performing the tag authentication with the asymmetric cryptography protocol, which works even if the reader 1 and the tag 3 belong to different operators. Accordingly, the reader 1 does not waste time deciding which authentication protocol to use. The tag systematically responds using the same (asymmetric) protocol, so it is not required to choose between protocols, because it knows that the asymmetric protocol is used for the tag authentication. As soon as the tag ID is received by the reader 1, it can immediately send its public key to the tag and thereby start the transaction. In fact, because the tag will in any case send its public key, the reader does not need to wait for the ID of the tag. It may send its public key to the tag 3 before the reception of the tag ID, or even broadcast the reader's public key to several tags. Thus, both the reader 1 and the tag 3 can start the transaction very quickly.

For a tag of operator B, the transaction stops after the tag authentication (assuming the reader is from a different operator). On the other hand, for a tag of operator A (the same operator as for the reader), the reader 1 still needs to authenticate itself. A natural way would be to chain the tag authentication with a mutual authentication by use of a standard symmetric cryptography. However this would be inefficient and involve unnecessary calculations.

Thus, according to the present invention, the tag authentication result performed with asymmetric cryptography is used to initialize the symmetric algorithm. Furthermore, only the reader authentication part is performed with the symmetric algorithm. This principle is illustrated below in more detail with reference to the flow chart of FIG. 2. In this example the asymmetric authentication part is done by following the principles of Algebraic Eraser (AE), while the symmetric authentication part is done by an algorithm called Grain128a. However, the teachings of the present invention are not limited to these specific algorithms or specific version of these algorithms. For instance, the asymmetric algorithm may be based on DH or ECC for example, and similarly one of many symmetric algorithms could be used instead of the Grain128a.

A version of the AE algorithm uses a public key of 160 bits, and a private key of 160 bits. It generates a shared session key of 160 bits. The Grain algorithm uses a Grain key of 128 bits and an input message (IV) of 96 bits. At the beginning of the authentication process the tag 3 has:

a tag private key KPrivTag (the length of which is 160 bits) for the asymmetric algorithm; and a shared secret key K (96 bits) for the symmetric algorithm.

At the beginning of the authentication process the reader 1 has:

a reader private key KPrivReader (160 bits) for the asymmetric algorithm;

a reader public key KPubReader (160 bits) for the asymmetric algorithm; and for each tag 3, 256 bits comprising:

a tag public key KPubTag (160 bits) for the asymmetric algorithm; and the shared secret key K for the symmetric algorithm.

If the tag 3 does not belong to the same operator as the reader 1, the shared secret key K may be set to null. Because the public keys are public, in the present example the process is optimised by pre-distributing the public key of the tag KPubTag to the reader. This means that the tag 3 does not need to transmit its public key during the transaction, saving some time. Alternatively, the tag 3 could transmit its public key KPubTag to the reader 1 during the authentication process. It is also to be noted that in this example, the shared secret key K and the tag public key KPubTag are tag specific, but in some applications there could be one shared secret key K and one tag public key KPubTag shared by a group of tags.

Figure 2:
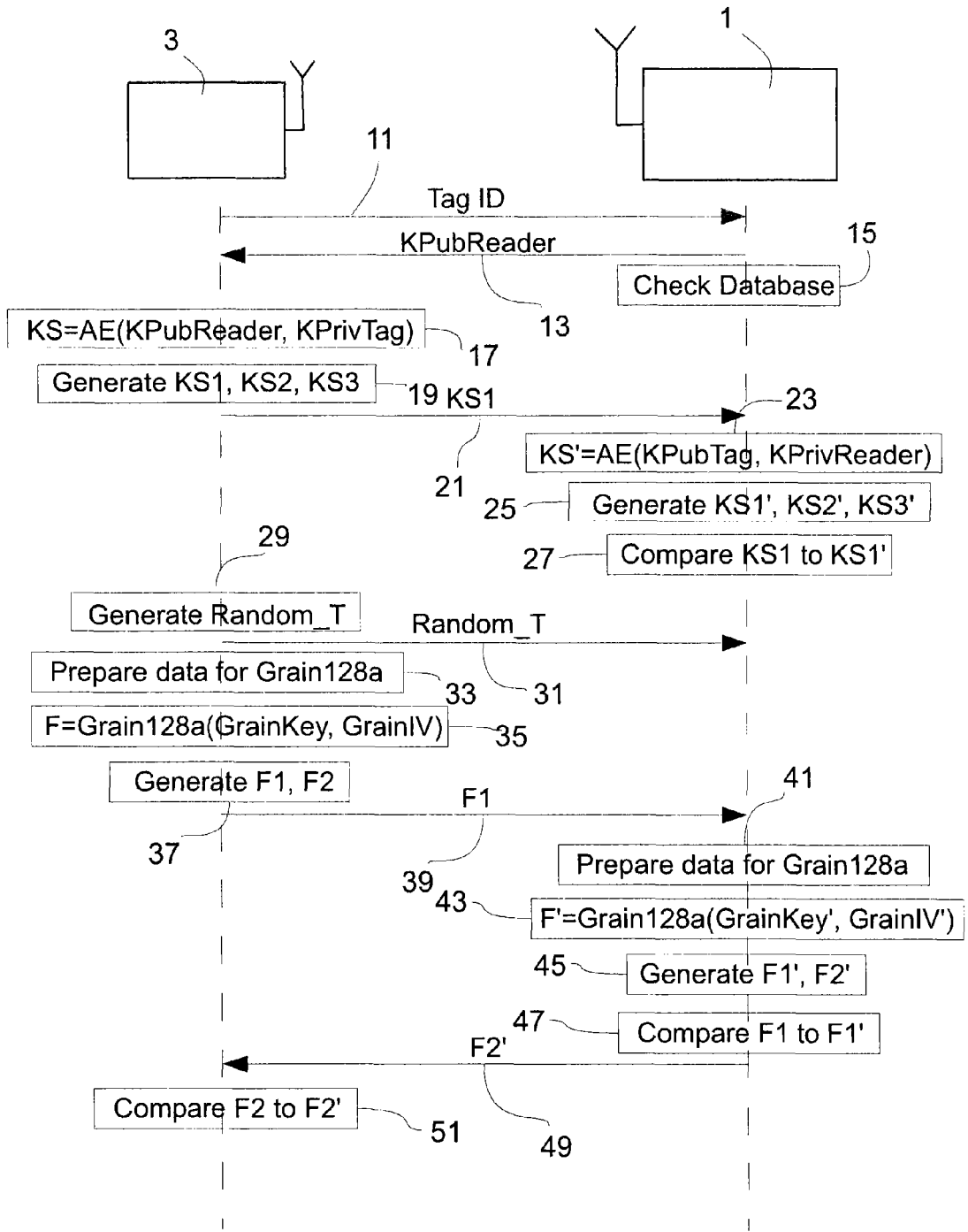
FIG. 2 is a flow-chart illustrating the authentication process according to an embodiment of the present invention.

Referring now to the flow chart of FIG. 2: in the authentication process in step 11 the tag 3 sends its ID to the reader 1. In response to the received ID, in step 13, the reader 1 sends it public key KpubReader to the tag 3. Later, the reader 1, checks (step 15) the look-up table in its database and fetches the shared secret key K and the tag public key KPubTag corresponding to the tag ID. Then in step 17 the tag 3 uses the received reader public key KPubReader as one of the parameters in the AE algorithm to generate or calculate a first session key of the tag KS=AE(KPubReader, KprivTag) (first session key of the second communication device). Another parameter in this algorithm is the tag private key KPrivTag. The length of the generated first session key is 160 bits. In step 19 the tag 3 splits the first session key KS into three portions: KS1 (80 bits), KS2 (48 bits) and KS3 (32 bits). In step 21 the tag 3 sends a portion of the first session key KS, in this example the first portion KS1 of the first session key KS to the reader 1. However, the full first session key KS may also be sent, but this is not necessary, since only part of the first session key is needed later in the process.

In step 23 the reader 1 generates a first session key of the reader KS'=AE(KPubTag, KPrivReader). As can be seen, the tag public key KPubTag and the reader private key KPrivReader are parameters in this AE algorithm. In step 25 the reader 1 splits the first session key of the reader KS' into three portions: KS1' (80 bits), KS2' (48 bits) and KS3' (32 bits). In step 27 the reader 1 compares the portion KS1 received from the tag to the first portion of the first session key of the reader KS1' and, if the values are identical, then the tag 3 is properly authenticated by the reader 1. In other words, the reader 1 has now identified the tag 3. If, however, KS1 is not the same as KS1', then the tag authentication has failed and the tag is rejected. Until this point the authentication has used the asymmetric cryptographic algorithm. However, according to the present invention, the process then switches to the symmetric cryptographic algorithm.

In step 29 the tag 3 generates a random number Random_T (length 48 bits in this example). In step 31 the random number Random_T is sent to the reader 1. In step 33 the tag 3 prepares the data for the generation of the second tag session key (second session key of the second communication device), which is generated in this example by the Grain128a algorithm. For this purpose the tag 3 generates a 128-bit key GrainKey, which is composed of the 96-bit shared secret key K stored in the tag 3, and of the 32 bits of KS3. Thus, GrainKey (128 bits)=(K (96 bits), KS3 (32 bits)). In this step another parameter for the Grain128a algorithm is also generated, namely a parameter called GrainIV (length 96 bits). The GrainIV is composed of the 48 bits of Random_T and the 48 bits of KS2. In step 35 the second tag session key or a first key-stream of Grain F=Grain128a(GrainKey, GrainIV) is generated or calculated. F is (32+n) bits long, where n is normally between 48 and 64 bits. In step 37 the tag 3 splits the generated key-stream F into two portions, namely F1 (32 bits) and F2 (n bits). In step 39 the tag 3 sends a portion of the generated key-stream, in this example the first portion F1 to the reader 1.

In step 41 the reader 1 prepares the data for the generation of the second reader session key (second session key of the second communication device), which is generated in this example by the Grain128a. For this purpose the reader 1 generates a 128-bit key, GrainKey' which is composed of the 96-bit shared secret key K stored in the reader 3 or in the database 5, and of the 32 bits of KS3'. Thus, GrainKey' (128 bits)=(K (96 bits), KS3' (32 bits)). In this step another parameter for the Grain128a algorithm is also generated, namely GrainIV' (length 96 bits). The GrainIV' is composed of the 48 bits of Random_T received in step 31 and the 48 bits of KS2'. In step 43 the second reader session key or a second key-stream of Grain F'=Grain128a(GrainKey', GrainIV') is generated or calculated. F' is (32+n) bits long, where n is normally between 48 and 64 bits. In step 45 the reader 1 splits the generated second key-stream F' into two portions, namely F1' (32 bits) and F2' (n bits). In step 47 the reader 1 compares the first portion F1 of key-stream F and the first portion F1' of key-stream F', and if their values are identical, then the tag 3 is determined to be part of the closed system, i.e. it is from the same group as the reader. If these two key-streams F1 and F1' are not the same, then the tag 3 and the reader 1 belong to different groups and the authentication process can be terminated. However, in this example they are identical and now in step 49 the reader 1 sends the second portion of the key-stream F2' to the tag 3, which compares in step 51 the second portion F2 of key-stream F2 to the second portion F2' of key-stream F2'. If these two key-streams are the identical, then the reader is properly authenticated by the tag 3, whereas if they are not the same, then the tag 3 rejects the reader 3. If the reader 1 is authenticated by the tag 3, then the reader has permission to modify the content of the tag 3.

In the above authentication process, because the communications of steps 21, 31 and 39 are all sent from the tag 3 to the reader 1, the data can be sent in one single message comprising: KS1 (80 bits), Random_T (48 bits) and F1 (32 bits), forming a string of 160 bits in the above example.

Grain128a generates its output (key-stream) bit per bit. It is therefore possible to compute only a part of the algorithm (for instance the first 32 bits, F1) and then pause the computation. The calculation may then be resumed later, to compute F2. As a consequence, the grain computation of step 35 can be split in 2 portions: first computation of F1 in step 35, while the computation of F2 can be postponed to just before step 51, if necessary. Similarly, step 45 may be configured so that F2' is computed is only if the outcome of step 47 is positive.

The above process also allows the reader 1 to determine if the tag 3 is part of the closed system by verifying if F1'=F1. Alternatively, it would be possible to search in the database 5 to verify whether or not the tag ID corresponds to a tag of the same system. By the completion of step 47, the reader 1 could have fetched this information from the database.

One embodiment has been described above, in which the authentication is based on the AE and Grain128a algorithms. However, other algorithms may be chosen instead for the asymmetric and symmetric algorithms. The AE algorithm also has several variants, and the private and public key sizes may have lengths other than 160 bits. Also, for instance the first portion KS1, KS1' can be the second portion KS2, KS2' or the third portion KS3, KS3'. Also the second portion KS2, KS2' can be the third portion KS3, KS3'.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. A method for a first communication device to authenticate a second communication device, each of the first communication device and the second communication device including a private key and a public key, the method comprising:

transmitting at least a first portion of a first session key of the second communication device from the second communication device to the first communication device, the first session key of the second communication device generated by the second communication device using the public key of the first communication device and the private key of the second communication device;

generating a first session key of the first communication device using an asymmetric key generation algorithm, the first session key of the first communication device generated by the first communication device using the public key of the second communication device and the private key of the first communication device;

comparing at least the first portion of the first session key of the second communication device and at least a first portion of the first session key of the first communication device, to thereby authenticate the second communication device;

generating a second session key of the first communication device using a symmetric key generation algorithm, when at least the first portion of the first session key of the second communication device and at least the first portion of the first session key of the first communication device are identical, such that the second communication device can authenticate the first communication device, wherein at least a second portion of the first session key of the first communication device is used to generate the second session key of the first communication device, and wherein the asymmetric key generation algorithm is based on an algebraic eraser algorithm, while the symmetric key generation algorithm is based on a Grain family algorithm.

2. The method according to claim 1, further comprising transmitting a random number from the second communication device to the first communication device and using the random number to generate the second session key of the first communication device.

3. The method according to claim 1, further comprising transmitting at least a first portion of the generated second session key of the first communication device from the first communication device to the second communication device.

4. The method according to claim 1, further comprising generating a second session key of the second communication device and sending at least a first portion of the second session key of the second communication device to the first communication device.

5. The method according to claim 4, further comprising comparing at least a second portion of the generated second session key of the second communication device and at least a portion of the second session key of the first communication device, and when they are identical, then the second communication device authenticates the first communication device.

6. The method according to claim 4, further comprising transmitting at least the first portion of the second session key of the second communication device to the first communication device and comparing it with at least a second portion of the second session key of the first communication device and, when they are identical, then the first communication device determining that the first communication device and the second communication device are managed by a single communication operator.

7. The method according to claim 1, wherein the symmetric key generation algorithm used to generate the second session key of the first communication device has a first parameter input and a second parameter input, and where the second portion of the first session key of the first communication device is used for the first parameter input, while a third portion of the first session key of the first communication device is used for the second parameter input.

8. The method according to claim 7, wherein a random number from the second communication device is also used for the first parameter input.

9. The method according to claim 7, wherein also a shared secret key of the symmetric key generation algorithm is also used for the second parameter input.

10. The method according to claim 1, wherein the first communication device is a radio frequency identification reader and the second communication device is a radio frequency identification tag.

11. The method according to claim 1, wherein authentication occurs without user input.

12. A computer program product comprising instructions executing on a computer and implementing the following:

transmitting at least a first portion of a first session key of the second communication device from the second communication device to the first communication device, the first session key of the second communication device generated by the second communication device using the public key of the first communication device and the private key of the second communication device;

generating a first session key of the first communication device using an asymmetric key generation algorithm, the first session key of the first communication device generated by the first communication device using the public key of the second communication device and the private key of the first communication device;

comparing at least the first portion of the first session key of the second communication device and at least a first portion of the first session key of the first communication device, to thereby authenticate the second communication device;

generating a second session key of the first communication device using a symmetric key generation algorithm, when at least the first portion of the first session key of the second communication device and at least the first portion of the first session key of the first communication device are identical, such that the second communication device can authenticate the first communication device, wherein at least a second portion of the first session key of the first communication device is used to generate the second session key of the first communication device, and wherein the asymmetric key generation algorithm is based on an algebraic eraser algorithm, while the symmetric key generation algorithm is based on a Grain family algorithm.

13. A first communication device to authenticate a second communication device, each of the first communication device and the second communication device including a private key and a public key, the first communication device comprising circuitry configured to:

receive at least a portion of a first session key of the second communication device from the second communication device, the first session key of the second communication device generated by the second communication device using the public key of the first communication device and the private key of the second communication device;

generate a first session key of the first communication device by using an asymmetric key generation algorithm, the first session key of the first communication device generated by the first communication device using the public key of the second communication device and the private key of the first communication device;

compare at least the portion of the first session key of the second communication device and at least a first portion of the first session key of the first communication device; and generate a second session key of the first communication device by using a symmetric key generation algorithm, when at least the portion of the first session key of the second communication device and the first portion of the first session key of the first communication device are identical, wherein the second session key of the first communication device is to be generated using at least a second portion of the first session key of the first communication device, and wherein the first communication device is a radio frequency identification reader and the second communication device is a radio frequency identification tag, and authentication occurs without user input, and wherein the asymmetric key generation algorithm is based on an algebraic eraser algorithm, while the symmetric key generation algorithm is based on a Grain family algorithm.

14. A second communication device to authenticate a first communication device, each of the first communication device and the second communication device including a private key and a public key, the second communication device comprising circuitry configured to:

receive a public key of the first communication device from the first communication device;

generate a first session key of the second communication device by use of the public key of the first communication device and the private key of the second communication device and by using an asymmetric key generation algorithm;

generate a second session key of the second communication device by using a symmetric key generation algorithm;

receive at least a portion of a session key of the first communication device; and compare at least a portion of the second session key of the second communication device and at least the portion of the session key of the first communication device to authenticate the first communication device, wherein at least a portion of the first session key of the second communication device is used to generate the second session key of the second communication device, and wherein generation of the second session key of the second communication is conditioned upon successful authentication using the first session key of the second communication device, wherein the first communication device is a radio frequency identification reader and the second communication device is a radio frequency identification tag, and authentication occurs without user input, and wherein the asymmetric key generation algorithm is based on an algebraic eraser algorithm, while the symmetric key generation algorithm is based on a Grain family algorithm.

* * * * *